United States Patent [19]

Arai et al.

[11] Patent Number: 4,466,123
[45] Date of Patent: Aug. 14, 1984

[54] APPARATUS AND METHOD FOR CORRECTING CONTOUR LINE PATTERN IMAGES

[75] Inventors: Yoshio Arai; Hiroyuki Kataoka, both of Kanagawa, Japan

[73] Assignee: Fuji Xerox Co., Ltd., Tokyo, Japan

[21] Appl. No.: 282,315

[22] Filed: Jul. 10, 1981

[51] Int. Cl.$^3$ .......................... G06K 9/02; H04N 1/40
[52] U.S. Cl. ........................................ 382/55; 358/96; 358/282
[58] Field of Search ...................... 382/55, 52, 54, 49, 382/27; 358/96, 282

[56] References Cited

U.S. PATENT DOCUMENTS 3,846,754 11/1974 Oka ........................................ 382/55

Primary Examiner—Howard W. Britton
Attorney, Agent, or Firm—Sughrue, Mion, Zinn, Macpeak and Seas

[57] ABSTRACT

An apparatus for producing a contour line pattern image from an original image such as a character or the like recorded in binary format in a memory couples image element points equidistantly isolated from edges of the original image and thereby forms a contour line pattern curve. The coupling of the equidistant points and the formation of the contour line pattern curve in the contour line pattern image are repeatedly carried out. Smudged areas of the contour line pattern image are detected and eliminated and missing portions of the contour line pattern image are regenerated.

11 Claims, 21 Drawing Figures

| SR1 | SR2 | SR3 |
| --- | --- | --- |
| SR4 | SR0 | SR5 |
| SR6 | SR7 | SR8 |

| $P_1$ | $P_2$ | $P_3$ |
|---|---|---|
| $P_k$ | $P_i$ | $P_5$ |
| $P_6$ | $P_7$ | $P_8$ |

APPARATUS AND METHOD FOR CORRECTING CONTOUR LINE PATTERN IMAGES

BACKGROUND OF THE INVENTION

Figure 1A:
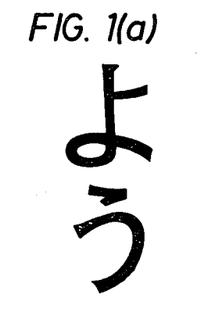
FIGS. 1(a) and 1(b) are views of an original image and an example of a contour line pattern image produced according to the present invention.
Figure 1B:
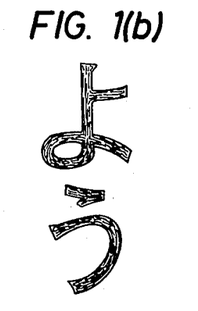

The present invention relates to a contour line pattern image produced from an original image such as characters or the like recorded in a binary format. More particularly, the invention relates to an apparatus for producing a contour line pattern image from an original image such as a character or the like recorded in a binary format and a method for detecting a smudged contour line pattern image and a method of regenerating missing portions of the contour line pattern image. The apparatus is constructed to produce the contour line pattern image as shown in FIG. 1(b) by coupling continuously points equidistantly isolated from the outlines of the original image to thereby form a contour line pattern curve and repeating the coupling of the equidistant points and the forming of the contour line pattern curve. The term "contour line pattern image" as used herein means an image represented by an equidistant curve group formed equidistantly for the outlines of an original image such as a character, a picture or the like as shown in FIG. 1(a), as designated in FIG. 1(b).

SUMMARY OF THE INVENTION

A primary object of the present invention is to provide an apparatus for producing a contour line pattern image from an original image for producing the outlines of a normal character or the like.

Another object of the present invention is to provide an apparatus for producing a contour line pattern image from an original image which can similarly produce the contour lines of the background of the original image.

Yet another object of the present invention is to provide an apparatus for producing a contour line pattern image from an original image which can vary the interval of the contour lines of the original image.

A further object of the present invention is to provide a method of detecting smudged or missing positions of a contour line pattern image thus produced from an original image and for correcting the same.

Still another object of the present invention is to provide a method of regenerating missing portions of a contour line pattern which may occur upon erasing smudged portions of the contour line pattern image or upon copying of the contour line pattern image, thereby regenerating a copied contour line pattern image without smudged or missing portions.

Still another object of the invention is to provide a method of detecting missing portions of a contour line pattern image and regenerating the same.

In accordance with these and other objects of the invention, there is provided an apparatus for producing a contour line pattern image from an original image including first and second memories A and B for storing all of contour line pattern image information of an original image, first means for detecting information of the image elements around an image element to be processed and which is read from the memory A and contained in one frame of the frame memories, second means for determining whether the image element to be processed is a part of a contour line of an image in accordance with information detected by the first means, third means for writing contour lines formed of an assembly of the image elements determined as being contour lines at least at every other image element in the memory B, fourth means for outputting information stored in the memory B after completing processing of information of one original image and displaying the image, and control for controlling processing of the first to fourth means.

The foregoing objects and other objects as well as the characteristic features of the invention will become more apparent and more readily understandable from the foregoing description and the appended claims when read in conjunction with the accompanying drawings.

DESCRIPTION OF THE PREFERRED EMBODIMENTS

Figure 2:
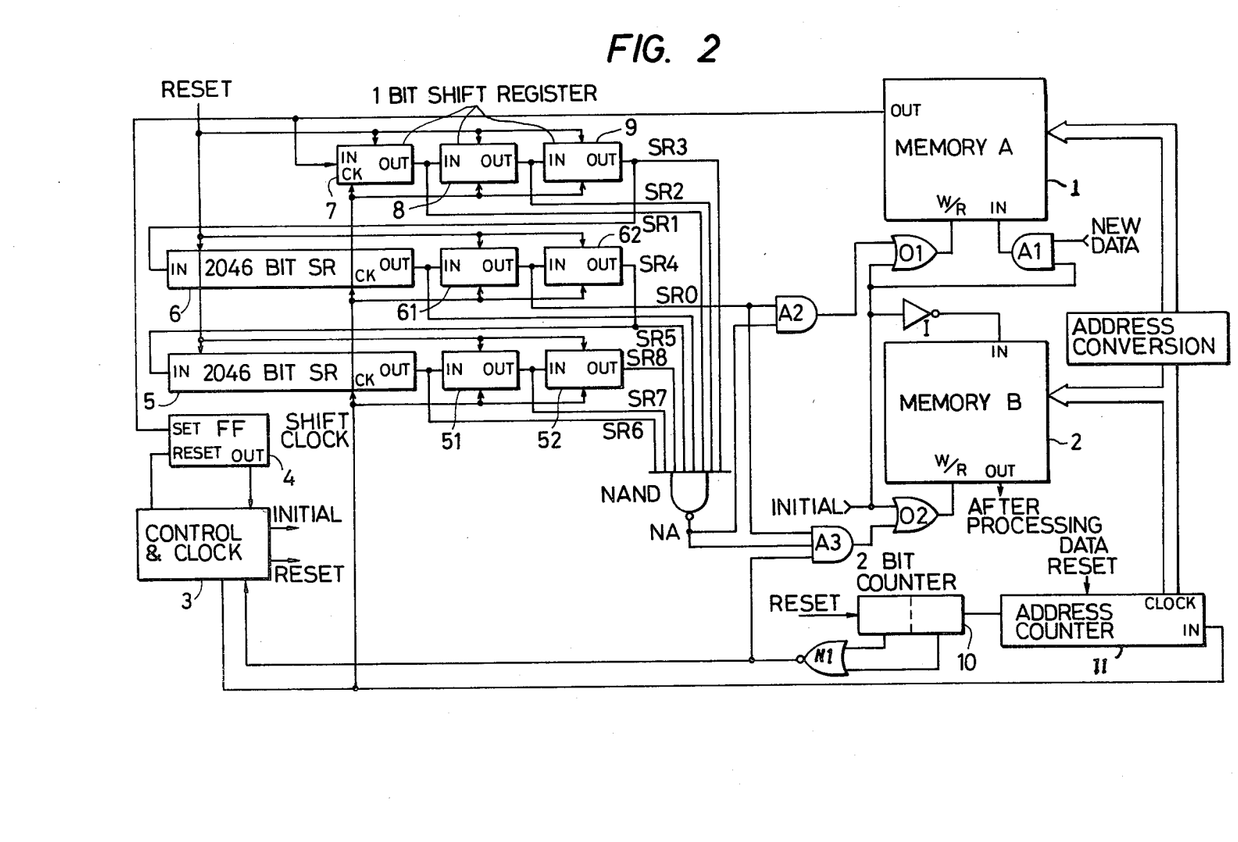
FIG. 2 is a schematic diagram showing a first preferred embodiment of an apparatus for producing a contour line pattern image from an original image constructed according to the present invention.

Reference is now made to the drawings, particularly to FIG. 2 showing a first preferred embodiment of an apparatus constructed according to the present invention for producing a contour line pattern image from an orginal image such as a character, a picture or the like recorded in binary format. Like reference numerals designate the same parts and components in the other figures. It is noted that although the following description relates to an example of an original image having 2048 image or picture elements in the direction of main scanning of the image, other original image arrangements are possible within the scope of the present invention. The apparatus for producing a contour line pattern image from an original image of the present invention includes memories A and B, generally designated by reference numerals 1 and 2, respectively, for storing an entire set of image or picture elements for one frame, a control and clock signal generator 3, a flip-flop 4, 2046-bit shift registers 5 and 6, 1-bit shift registers 7 through 9, 51, 52, 61 and 62, a 2-bit counter 10, an address counter 11, and an address converter 12.

When a START signal is inputted to the apparatus for producing a contour line pattern image from an original image of the invention shown in FIG. 2 (to one input of the control and clock generator 3), the control and clock generator 3 produces on one output terminal thereof an INITIAL signal at a high level "1" which is coupled to corresponding input terminals of OR gates 01 and 02 during a scanning period of all the locations of the memories A 1 and B 2. The INITIAL output signals from the OR gates 01 and 02 are in turn applied to the W/R inputs of the memories A and B 1 and 2, respectively, accordingly setting the memories A and B in a write mode. Simultaneously, the control and clock generator 3 produces a clock signal which is connected to the clock input of the address counter 11. The address counter 11 produces clock signals for sequentially designating the addresses of the memories A 1 and B 2.

Figure 3A:
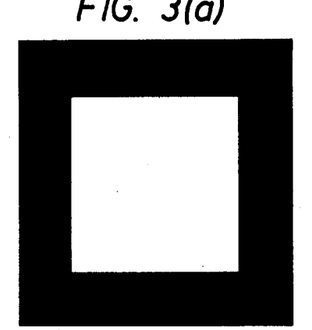
FIGS. 3(a), 3(b), 3(c), 3(d), 3(e), and 3(f) are views of contour line pattern images in the course of processing the original image to produce the contour line pattern image.

At this time, new DATA is applied to one input terminal of an AND gate A1, corresponding to an image shown in FIG. 3(a), and the new DATA from the AND gate A1 is in turn applied to the IN input of the memory A 1 since the INITIAL signal at a high level "1" has already been applied to the other input terminal of the AND gate A1, as described above, from the control and clock generator 3. Thus, the memory A 1 stores the new DATA.

On the other hand, the INITIAL signal at a high level "1" is also applied to the input of an inverter I, which inverts the INITIAL signal and produces a low level "0" applied to the IN input of the memory B 2. Thus, an INITIAL signal of "0" applied to the memory B 2 operates to clear all the locations in the memory B 1.

The control and clock generator 3 also produces from yet another output terminal a RESET signal which is coupled to the RESET input terminals of the shift registers 5, 6, 7 through 9, 51, 52, 61 and 62, the flip-flop 4, and the counters 10 and 11 as shown in FIG. 2, thereby resetting all the shift registers 5, 6, 7 through 9, 51, 52, 61 and 62, the flip-flop 4, and the counters 10 and 11, respectively.

The operation of the apparatus for producing a contour line pattern image from an original image of the invention as shown in FIG. 2 will be described in detail assuming that new DATA of an image shown in FIG. 3(a) has been applied through the AND gate A1 to the IN input of the memory A 1 and is thus stored in the memory A.

When the new DATA has been completely stored in the memory A 1 as described above, the address counter is reset by the RESET signal applied to the RESET input of the address counter 11 from the control and clock generator 3. Further, the INITIAL signal from the first output terminal of the control and clock generator 3 is sequentially reset to a low level "0". The INTIAL signal of a low level "0" thus produced from the control and clock generator 3 is applied to the corresponding input terminals of the OR gates 01 and 02 and hence to the W/R inputs of the memories A 1 and B 2. These signals accordingly set the memories A 1 and B 2 in a read mode.

In the meantime, the address counter 11 sequentially counts the clock signals from the control and clock generator 3, increasing its count value, and thereby designating reading addresses of the memories A 1 and B 2, which are set in the read mode.

In this case, the clock signals from the address counter are applied to the clock input of the memory B 2 and also to the input of the address converter 12 which operates to control the address designating clock signal from the address counter 11 so that the clock signal applied to the clock input of the memory A 1 precedes by one scanning line segment that applied to the memory B 2. More particularly, if the address designation of the memory A 1 is represented by ADa and the address designation of the memory B 2 is repesented by ADb, the address ADa becomes equal to [ADb+2048].

The data stored in the memory A 1 and sequentially read out from the OUTPUT terminal of the memory A 1 is in turn applied to the input of the 1-bit shift register 7. The data thus applied to the shift register 7 is sequentially transferred through the shift registers 8, 9, the 2046-bit shift register 6, 1-bit shift registers 61 and 62, the 2056-bit shift register 5, and the 1-bit shift registers 51 and 52.

Figure 4:
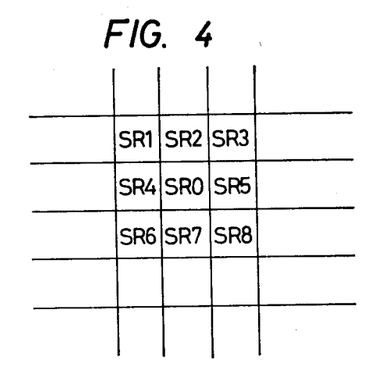
FIG. 4 is a view of an array of shift registers for the signals of the original image to be processed in the course of processing the image.

When a signal SR0 of the image or picture element to be processed in this apparatus is produced from the shift register 61 and is in turn applied to the corresponding inputs of AND gates A2 and A3, signals corresponding to the image elements located at the upper left, immediately upper, upper right, left side, right side, lower left, immediately lower and lower right positions of the image are respectively produced, as designated by SR1 through SR8, from the shift registers 7, 8 and 9, the most significant bit of the shift register 6, the shift register 62, the most significant bit of the shift register 5, and the shift registers 51 and 52 as shown in FIGS. 2 and 4. These are coupled to the first to eighth input terminals of a NAND gate.

When the signal SR0 from the output of the shift register 61 is "0," the signal SR0 closes the AND gates A2 and A3. Accordingly, the "0" output signals from the AND gates A2 and A3 are applied through the OR gates 01 and 02, respectively, to the W/R inputs of the memories A and B 1 and 2, respectively, thereby setting the memories A and B 1 and 2 in the read mode. Accordingly, the stored contents of the memory B 2 are not altered, but remain "0". In this case, the NA output from the NAND gate is applied to the second input terminals of the AND gates A2 and A3. Further, the outputs from the 2-bit counter 10 are applied to both input terminals of a NOR gate N1, and the output from the NOR gate is in turn applied to the third input terminal of the AND gate A3 and also to another input terminal of the control and clock generator 3 (the details of which will be described below).

On the other hand, when the signal SR0 is at a high level "1" the NAND gate functions to test the state of the input signals thereto to determine whether or not the signals SR1 through SR8 from the image elements around the signal SR0 as shown in FIG. 4 as read from the new DATA applied to the memory A are all at a high level "1". If all the signals SR1 through SR8 are "1," the NAND gate produces an output signal NA of "0." The output of the NAND gate is applied to the AND gates A2 and A3, to close the same when the output from the NAND gate is "0." Accordingly, the output signals from the AND gates A2 and A3 become a low level "0" which, through the OR gates 01 and 02, set the memories A and B 1 and 2 in the read mode, as described above. The stored content of the memory B 2 is not modified, and remains "0."

When all the signals SR1 through SR8 are, on the other hand, not "1" and at least one of the signals SR1 through SR8 is accordingly at a low level "0" (representing white), the NAND gate produces an output signal NA at a high level "1." This "1" signal opens the AND gates A2 and A3 since the signal SR0 from the shift register is at a high level "1," as described above, and the signal from the NOR gate N1 is also at a high level "1," for reasons which will be described in greater detail below. As a consequence, the output signal of high level thus produced from the AND gate A2 is applied through the OR gate 01 to the W/R input of the memory A 1 whereupon the memory A 1 is set in the write mode. However, since the signal connected from the AND gate A1 to the IN input of the memory A 1 is at a low level "0," the signal SR0 in the memory A 1 is changed to a low level "0". A signal SRO which satisfies the aforementioned conditions in the circuit described above forms a part of a contour line of the image as shown in FIG. 3(a). All such signal points are erased in the memory A 1 by the aforementioned operation in the apparatus shown in FIG. 2.

The RESET signal from the contour and clock generator 3 is applied to the 2-bit counter 10 at the initial operation of the apparatus shown in FIG. 2, and the counter 10 is thus reset to the "00" state. The "00" outputs from the counter 10 are in turn applied to the inputs of the NOR gate N1, and the NOR gate N1 thus produces an output of a high level "1." This is in turn applied to the third input of the AND gate A3 and also to the control clock generator 3. Accordingly, in the above described data all three inputs to the AND gate A3 are a high level "1," and the AND gate A3 in turn produces an output of a high level "1." The output of "1" from the AND gate A3 is in turn applied through the OR gate 02 to the W/R input of the memory B 2, thereby setting the memory B 2 in the write mode. Since the INITIAL signal applied to the first input terminal of the OR gate OR2 is at a low level "0" and the signal is inverted into a high level "1" by the inverter I, a high level "1" signal is stored at the address corresponding to the signal SR0 of FIG. 4 in the memory B 2.

Figure 3B:
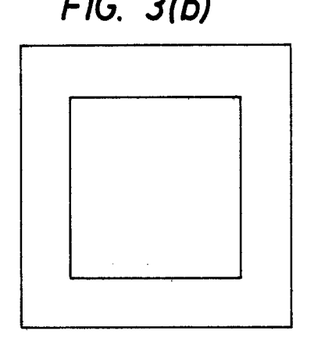
Figure 3C:
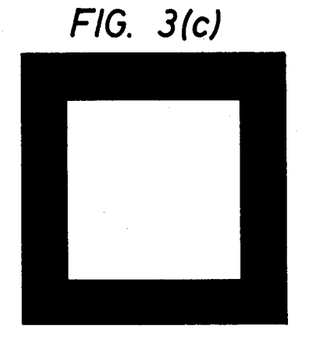

When the above described operation has been continuously executed for one complete frame of the original image to be processed, the original image shown in FIG. 3(a) stored in the memory A 1 is converted into a narrowed configuration as the contour lines of the image are erased as shown in FIG. 3(c). On the other hand, the contour lines of the image shown in FIG. 3(a) are stored in the memory B 2, as shown in FIG. 3(b).

The output signal OUT from the memory A is also applied to the SET input of the flip-flop 4. Since the output signals from the memory A include more than one signal at a high level "1" in the aforementioned operation of the apparatus shown in FIG. 2, the flip-flop 4 is put in a SET state.

Figure 3D:
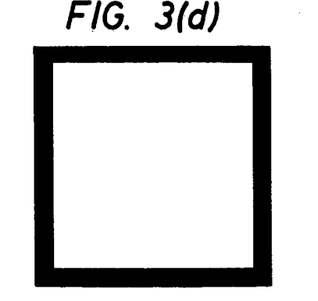

When the operation is then executed in the same manner as described above for the image shown in FIG. 3(c), another output is applied from the address counter 11 to the 2-bit counter 10, and the counter 10 in turn produces outputs "01" to the inputs of the NOR gate. The NOR gate then produces in turn an output of a low level "0" to the third input terminal of the AND gate A3 and also to the control and clock generator 3. Thus, the AND gate A3 is closed by the output "0" from the NOR gate N1. Accordingly, the outpt "0" is in turn applied from the AND gate A3 through the OR gate 02 to the W/R input of the memory B 2, thereby setting the memory B 2 in the read mode. If a point or any portion of the contour line of the image is detected and processed in the apparatus shown in FIG. 2 as described above, it is not written into the memory B 2. However, the stored image in the memory A is further narrowed by one image element segment in the same manner as described above. After the same operation is repeated until the content of the 2-bit counter 10 becomes sequentially "10" and then "11", the AND gate A3 is closed in the same manner thereby setting the memory B 2 in the read mode similar to the above operation. Accordingly, the bit of the contour line of the image is not written in the memory B 2, but the stored image in the memory A 1 is further narrowed as shown in FIG. 3(d).

Figure 3E:
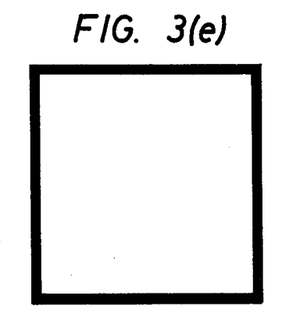

Since the count of 2-bit counter 10 again reaches "00" in the fourth frame in the apparatus shown in FIG. 2, the contour line of the stored image in the memory A 1 at that time is stored in the memory B 2. Thus, the stored images in the memories A and B 1 and 2, respectively, become those as shown in FIGS. 3(e) and 3(f).

When the same operation is further repeated in the apparatus shown in FIG. 2, the stored content in the memory A 1 becomes all "0"s. The signal at a low level "0" from the OUTPUT of the memory A 1 is then applied to the SET input of the flip-flop 4. The flip-flop 4 is then reset by the RESET signal from the contour and clock generator 3 when the next frame is completely processed in the apparatus shown in FIG. 2. The RESET output of the flip-flop 4 at this time is applied to the other input of the control and clock generator 3, thereby stopping the operation of the control and clock generator 3 and accordingly the overall apparatus shown in FIG. 2.

Figure 3F:
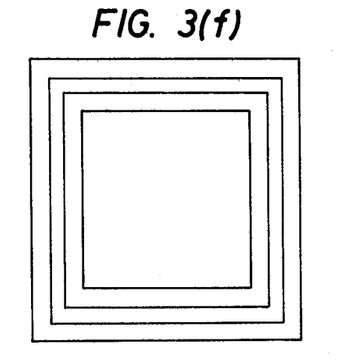

The contour line pattern image thus processed in the apparatus shown in FIG. 2, as shown in FIG. 3(f), is stored in the memory B 2. When the contour line pattern image thus stored in the memory B 2 is applied to a suitable output device, for example, a raster scanning type printer, a visible image will be produced corresponding to the contour line pattern.

It will be appreciated from the foregoing description that the apparatus for producing a contour line pattern image from an original image thus constructed and operated is useful for producing the outline of a normal character or the like, or the "skeleton" of a normal character, as a preprocessing step in reading the character optically.

It will be readily understood by those skilled in the art that, although the foregoing description is directed to an apparatus which converts an original image into a contour line pattern image, if white and black are reversed, the same apparatus can also similarly produce the contour lines of the background of a original image. Also the interval of the contour line pattern can be varied by altering the logic operation format of the output of the 2-bit counter for applying an output to the AND gate A3.

It is also noted that, although the foregoing description is directed to a circuit using combinations of unit logic elements, the apparatus of the present invention can also be executed by suitably programming a computer or the like.

The counter line pattern image thus produced may be smudged by later handling, or it may be intentionally revised.

Figure 5:
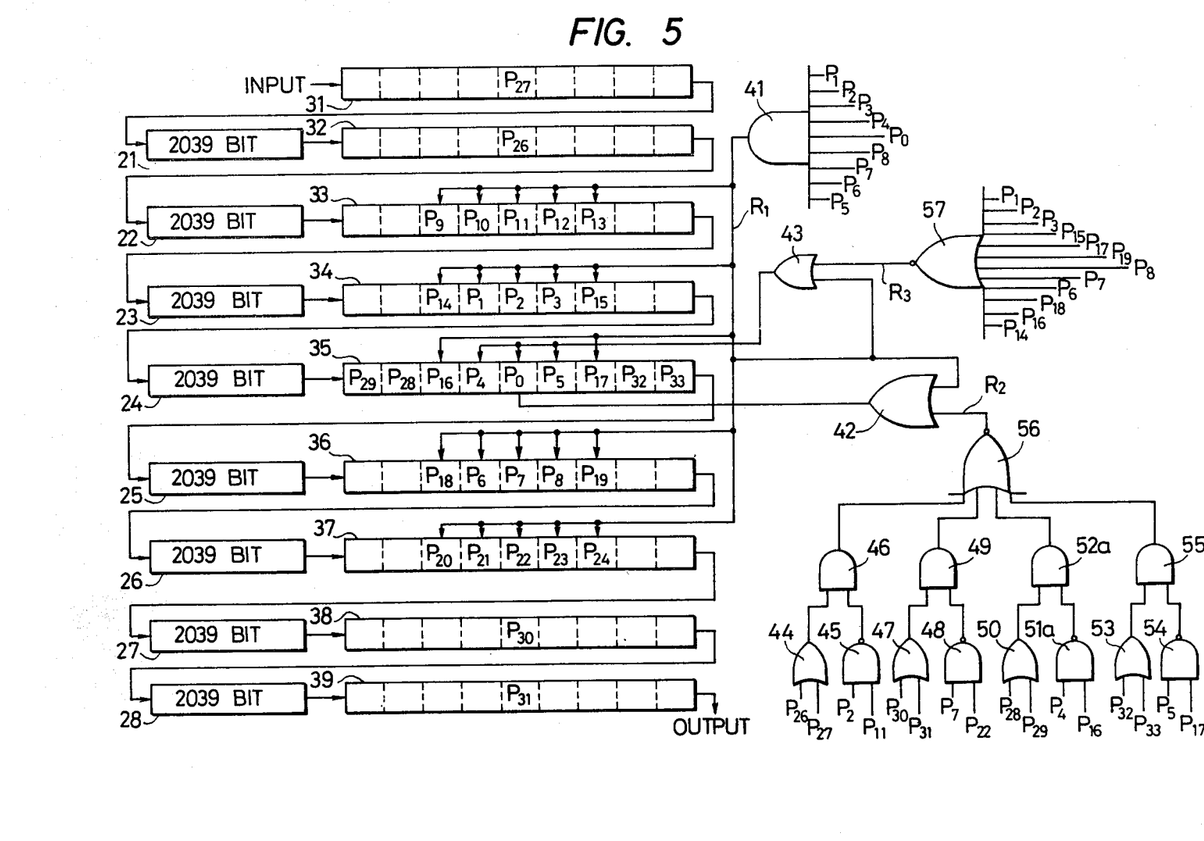
FIG. 5 is a view similar to FIG. 2 but showing a second preferred embodiment of an apparaus for producing a contour line pattern image from an original image constructed according to the present invention.

FIG. 5 shows another preferred embodiment of an apparatus for producing a contour line pattern image from an original image constructed according to the present invention. In FIG. 5, the apparatus of this embodiment includes 2039-bit shift registers 21 through 28, and 9-bit shift registers 31 through 39, which are sequentially connected in series from an initial input to an output.

An image signal in binary format read by a raster scanning reader is inputted to the input of the first shift register 31. One scanning line is assumed to have 2048-bits (image elements). Thus, the positional relationship of the information or signals in the respective shift registers in FIG. 5 coincides with the inputted original image. It is noted that the number of total bits in one scanning line is not limited to 2048 bits.

The operation of the method of detecting a point or bit $P_0$ to be processed, and which is stored in the fifth bit of the shift register 35 as black and at a high level "1," and whether the point $P_0$ is normal or smudged, will be described in detail with reference to FIG. 5.

Figure 6:
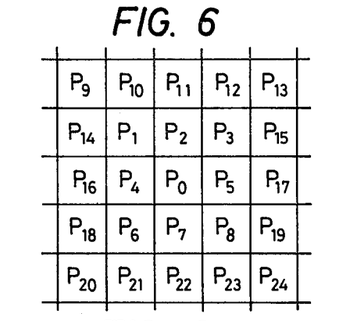
FIG. 6 is a view of an array of points to be processed of the original image as a part of the contour line pattern image, given for explanatory purposes.

As is apparent from the array of image elements in the contour line pattern image shown in a FIG. 6, in case where the point $P_0$ forms a part of a contour line pattern image, it is impossible for all the bits $P_1$ through $P_8$ around the bit $P_0$ to be black and hence at a high level "1". Accordingly, the following equation (1) cannot be established.

$$P_0 \cdot P_1 \cdot P_2 \cdot P_3 \cdot P_4 \cdot P_5 \cdot P_6 \cdot P_7 \cdot P_8 = 1 \tag{1}$$

The bit signals $P_0$ through $P_8$ are applied from the contour line pattern image to the first to eighth input terminals of an AND gate 41 in FIG. 5, and the AND gate 41 thus evaluates the above equation (1). When all the bits $P_0$ through $P_8$ are black and are at a high level "1," the points or bits $P_0$ through $P_8$ are regarded as being smudged, and an output reset signal R1 at a high level "1" produced at the output of the AND gate 41 is applied to the bit inputs of the respective shift registers corresponding to the points or bits $P_0$ through $P_8$ thereby resetting the contents of the respective shift registers 33 through 37 as shown in FIG. 5. In this manner, smudges on the contour line pattern image are removed or erased.

Figure 7A:
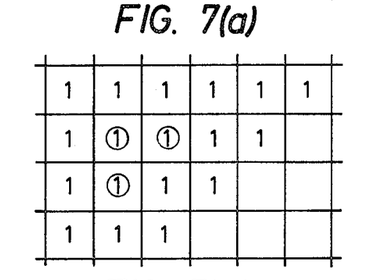
FIGS. 7(a) and 7(b) are views of arrays of points detected as smudges by a method of detecting smudges in a contour line pattern image according to the present invention.
Figure 7B:
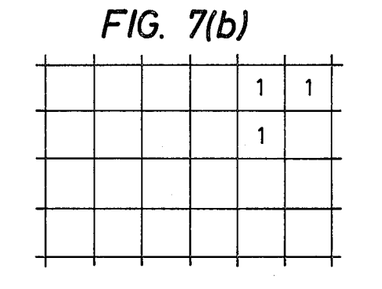

When a smudged area in the form of a thick oblique line appears, as designated by the points 1 (1) in FIG. 7(a), the equation (1) will have a value of "1" only at the three points or bits designated by 11 1 in the contour line pattern image shown in FIG. 7(a). The value of equation (1) will be "0" at points or bits other than these three points or bits. Accordingly, the apparatus shown in FIG. 5 cannot detect or erase the three points or bits designated by "1" in FIG. 7(b) so that a smudge remains at these points.

When the point or bit $P_0$ to be processed is black and at a high level "1" and is erased as representing a smudge and the points or bits $P_9$ through $P_{24}$, removed by one bit from the eight points or bits $P_1$ through $P_8$ as shown in FIG. 6, are white and at low levels "0," the corresponding area or points may also be set to a low level "0" on the basis of the aforementioned detecting operation in the apparatus shown in FIG. 2. Therefore, the output reset signal R1 from the AND gate 41 is applied directly to or through the OR gates 42 and 43 to the respective shift registers 33 through 37 at the corresponding stages, thereby resetting the contents of the respective shift registers 33 through 37 as shown in FIG. 5.

Figure 8:
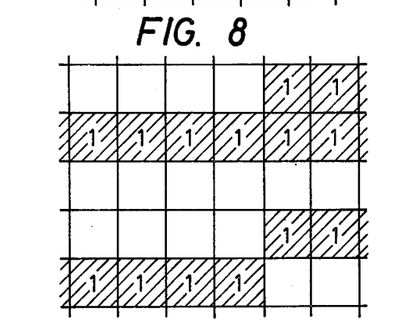
FIG. 8 is a view of an array of points to be detected and erased in the course of detecting smudges in a contour line pattern image by a method according to the present invention.

From the foregoing description of the operation of the apparatus shown in FIG. 5, a relatively large smudge may be detected and erased by the apparatus shown in FIG. 5. However, a small speck having a size of less than two dot or image elements as shown in the shaded area in the upper half portion in FIG. 8 cannot be detected or erased by the operation as described above with the apparatus shown in FIG. 5. In FIG. 8, the shaded area of the lower half portion forms a contour line pattern image to be constructed according to the present invention.

Figure 9:
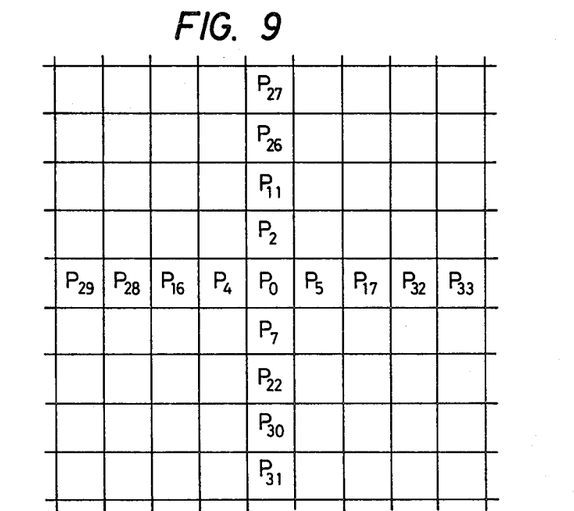
FIG. 9 is a view of an array of the points to be processed in the course of detecting smudges in a contour line pattern image according to the present invenion.

A method of detecting a slender or linear smudge will now be described with reference to FIG. 9 which shows an example of an array of points of bits to be processed in the apparatus shown in FIG. 5. In FIG. 9, if the point or bit $P_0$ to be processed is black and at a high level "1" on the contour line pattern image, if there is at least one bit white point directly adjacent to the point $P_0$ at the upper and lower as well as right and left points and at least one bit black point adjacent to the white points at the upper and lower as well as right and left points, the point $P_0$ is regarded as a part of the contour line pattern image. In this case, the following equations (2) through (5) have values of "1" for the respective four directions:

$$P_0 \cdot (P_{26} + P_{27}) \cdot \overline{P_{11} \cdot P_2} = 1, \tag{2}$$

$$P_0 \cdot (P_{30} + P_{31}) \cdot \overline{P_7 \cdot P_{22}} = 1, \tag{3}$$

$$P_0 \cdot (P_{28} + P_{29}) \cdot \overline{P_4 \cdot P_{16}} = 1, \tag{4}$$

and $$P_0 \cdot (P_{32} + P_{33}) \cdot \overline{P_5 \cdot P_{17}} = 1. \tag{5}$$

Accordingly, the apparatus shown in FIG. 5 detects whether the relationship of the equations (2) through (5) is true or not, and detects whether the point P to be processed should be regarded as a part of the contour line pattern image and consequently to retain it as it is, if any one of the above equations (2) through (5) has a value of "1." The apparatus determines that a smudge area is present and erases it when all of the above equations (2) through (5) have values of "1."

The aforementioned detecting and erasing operations are executed through a logic circuit composed of logic elements 44 through 56 in the apparatus shown in FIG. 5. As is evident from the circuit of the apparatus shown in FIG. 5, the equation (2) is calculated, for example, by an OR gate 44, a NAND gate 45 and an AND gate 46. The points $P_{26}$ and $P_{27}$ are applied to the inputs of the OR gate 44. The points P₂ and P₁₁ are applied to the inputs of the NAND gate 45. Subsequently, the output from the OR gate 44 and the output from the NAND gate 45 are applied to the inputs of the AND gate 45. Similarly, the equations (3), (4) and (5) are calculated by an R gate 47, a NAND gate 48 and an AND gate 49; an OR gate 50, a NAND gate 51a and an AND gate 52a; and an OR gate 53, a NAND gate 54 and an AND gate 55, respectively upon reception of the points $P_{30}$, $P_{31}$ and $P_7$, $P_{11}$; $P_{28}$, $P_{29}$ and $P_4$, $P_{16}$; and $P_{32}$, $P_{33}$ and $P_5$, $P_{17}$, respectively.

A method of detecting a small smudge will now be described with reference to FIG. 6 together with a method of erasing the same. In FIG. 6, when the apparatus shown in FIG. 5 detects, for example, n continuous dots such as three dots or points $P_4$, $P_0$ and $P_5$ by detecting whether the 12 dots or points around these three dots or points are white or black, if it detects no black dots at a high level "1" in any the 12 points around the three dots $P_4$, $P_0$ and $P_5$, these three dots or points may be regarded as representing a smudged area. More particularly, if the following equation (6) executed by the apparatus shown in FIG. 5 is found to have a value of 0, the three points $P_4$, $P_0$ and $P_5$ are detected as representing a smudged area and are are consequently erased:

$$P_1+P_2+P_3+P_{15}+P_{17}+P_{19}+P_8+P_7+P_6+P_{18}+P_{16}+P_{14}=0 \quad (6)$$

The equation (6) is executed by a NOR gate 57 in FIG. 5. More particularly, the points or dots $P_1$, $P_2$, $P_3$, $P_{15}$, $P_{17}$, $P_{19}$, $P_8$, $P_7$, $P_6$, $P_{18}$, $P_{16}$ and $P_{14}$ are applied to first to twelfth input terminals of the NOR gate 57. All the inputs $P_1$, $P_2$, $P_3$, $P_{15}$, $P_{17}$, $P_{19}$, $P_8$, $P_7$, $P_6$, $P_{18}$, $P_{16}$ and $P_{14}$ applied to the inputs of the NOR gate 57 are at high levels "1," when the equation (6) becomes true, and the NOR gate 57 thus produces an output reset signal R3 which is applied in turn through the OR gate 43 to the bits corresponding to the points $R_4$, $R_0$ and $P_5$ of the shift register 35. These points $P_4$, $P_0$ and $P_5$ are thus reset in the shift register 34 and are erased by setting them to a low level "0."In this case, in the embodiment shown in FIG. 5, it may be preferred that the inputs to the AND gate 41, OR gates 41, 47, 50 and 53, the NAND gates 45, 48, 51a and 54, and the NOR gate 57, respectively, be produced from the corresponding stages of the shift registers 33 through 37, and that a frame memory (not shown) or a second shift register group, the same as those shown in FIG. 5, be provided and that RESET signals R1 and R2 be applied to corresponding addresses of the frame memory or to the stages of the second shift register group so that the stored contents in the memory can be reset.

It may be appreciated from the foregoing description that since the method of detecting and erasing smudges of this embodiment is thus executed on all the image elements of the contour line pattern image, all relatively large smudges and even undesired slender lines and very small spots can be detected and erased on the contour line pattern image thus produced, and a contour line pattern image of high quality without smudges can consequently be regenerated and revision of the original contour line pattern image can be readily performed.

It may also be understood that, although the above described embodiment is directed to a contour line pattern image in which the width and interval between the contour lines is one bit, it is evident from the foregoing description to those skilled in the art that even if the width and interval between the contour lines are other than one bit, the above embodiment may be applied merely by changing the pattern of the contour line pattern image to be compared around the point or dot to be processed or detected.

It is also noted that, although the foregoing description of the second embodiment of the invention is directed to an embodiment implemented with discrete logic elements, the apparatus of the second embodiment of the present invention can also be executed by suitably programming a computer or the like.

Figure 10:
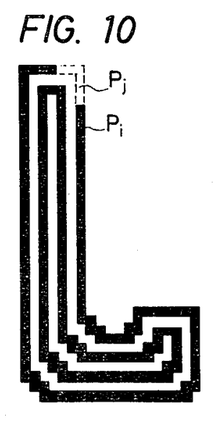
FIG. 10 is a view of an example of missing portions of a contour line pattern image.

In case that the contour line pattern image thus produced is further copied by a copying machine or the like, missing portions shown by broken lines in FIG. 10 may frequently occur on the recopied contour line pattern image.

Figure 11:
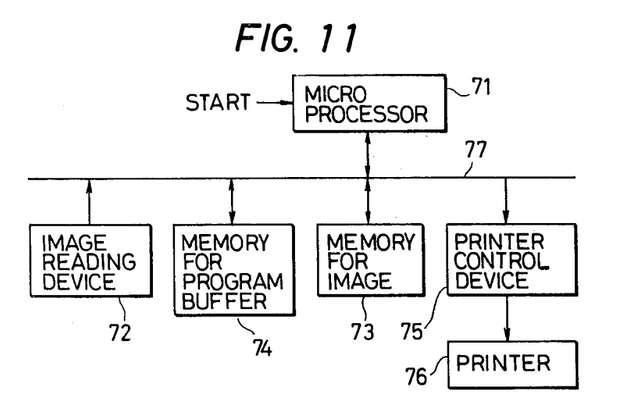
FIG. 11 is a block diagram of an apparatus for regenerating missing portions of a contour line pattern image adapted for executing a method of regenerating the missing portions of the contour line pattern image thus produced.
Figure 12:
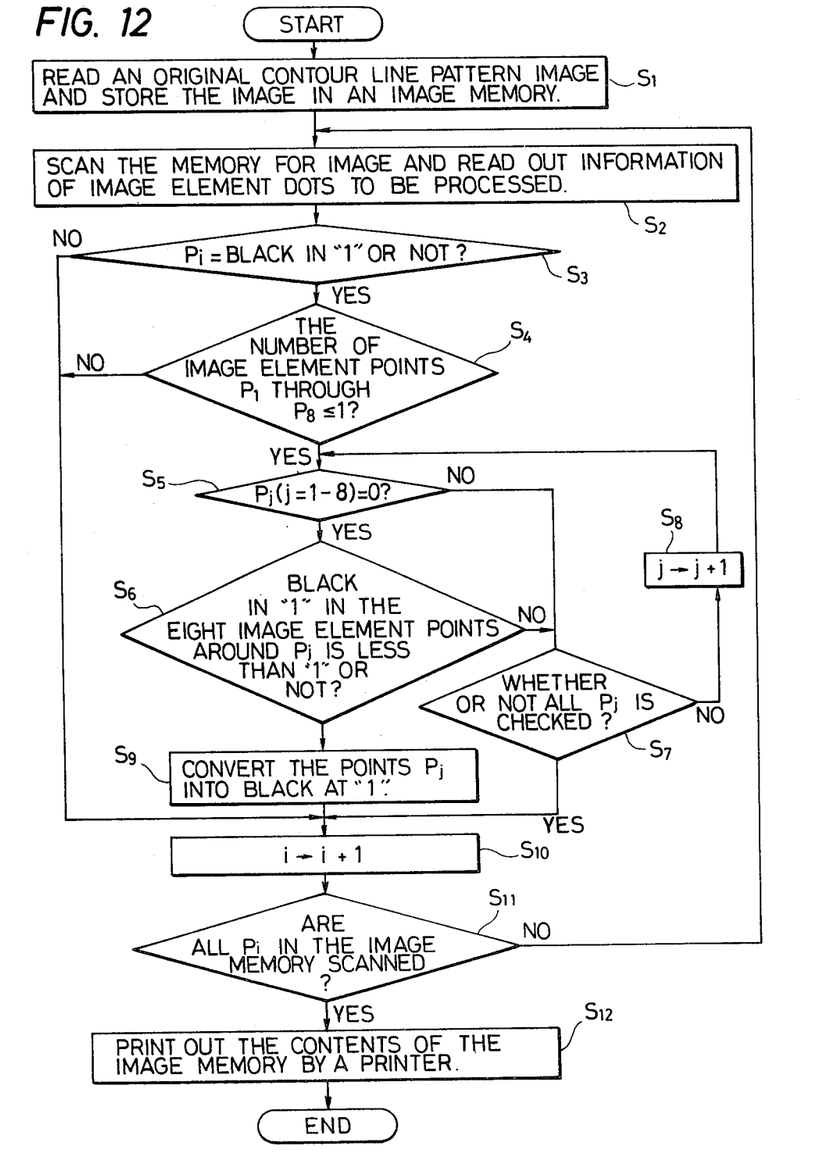
FIG. 12 is a flow chart for explaining operations of the apparatus shown in FIG. 11.

A third preferred embodiment of the invention wherein the missing portions of a contour line pattern image thus produced are generated will be described with reference to FIGS. 11 through 15. FIG. 11 shows a block diagram of the third preferred embodiment of the present invention, and FIG. 12 is a flowchart for explaining the apparatus shown in FIG. 11. As shown in FIG. 11, the circuit of this embodiment includes a microprocessor 71, an image reading device 72, a memory 23 for an image, a memory 24 for a program and a buffer, a printer controlling device 25, a printer 27, and a bus line 27 for communicating commands and data.

The operation of the apparatus shown in FIG. 11 will now be described with reference to FIGS. 11 and 12. It is noted in the following description that the interval of the contour line is assumed to be one bit or one image element.

An original image or contour line pattern image is read by the image reading device 72 and is then stored through the bus line 77 in the image memory 73 in step S1 when a START signal is applied to the apparatus. Then, the microprocessor 71 operates to cause the image reading device 72 to read a point or dot $P_i$ of an image element signal from the stored information, or points or dots of the contour line pattern image in the memory 73, by scanning the memory 73 in the step S2. The microprocessor 51 subsequently determines whether the point $P_i$ thus read is white at a low level "0" or black at a high level "1" in the third step S3.

Figure 13:
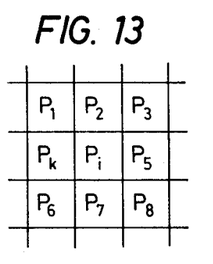
FIG. 13 is a diagram of an array of points to be processed in the course of regenerating missing portions of the contour line pattern image thus produced.

If the point $P_i$ is black, the microprocessor 71 operates to count the number of points $P_j$ of the image elements which are black and at the high level "1," where j represents integer numbers 1 through 8, around the points $P_i$ on the image in FIG. 13, and also determines whether the number of points $P_j$ is 1 or 0 in the step 54.

When the number of points $P_i$ is 1 or 0 in step S4, the microprocessor 71 detects the open end of the contour line pattern image and then proceeds to step S5. The microprocessor 71 operates to check whether each of the points $P_j$ (j=1 to 8) around the point $P_i$ is "0" in step S5.

When the point $P_i$ is at a "0" low level representing white, the microporcessor 71 further detects whether the number of the eight points of image elements around the point $P_j$ which are black and at a high level "1" is "1" or "0", in the same manner as in step S4, at step S6.

Figure 14:
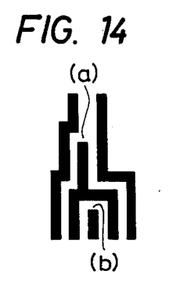
FIG. 14 is a view of another example of a contour line pattern image in the course of regenerating missing portions of the contour line pattern image thus produced.

When the number of points $P_i$ at a high level "1" in step S5 is not "0," it means that the point $P_i$ is not a missing portion as designated by the portion a or b in FIG. 14, and hence the microprocessor 71 proceeds to the next step S7. Then, the microprocessor 71 further operates to check whether or not the determinations made in steps S5 and S6 have been executed for all the points $P_i$ in step S7. When the checks S5 and S6 are completely executed for all the points $P_i$, 1 is added to j (j+1), and similar checks in steps S5 and S6 are repeatedly executed for the other points around $P_i$ in step S8.

When the number of the eight points around the point $P_j$ which are black and at a high level "1" is found to be 1 or 0 in step S6, the microprocessor 71 detects the missing portion of the image at the position $P_j$ and thus converts the signal at the position of the point $P_j$ in the memory 23 into black at a high level "1" in step S9. At the time, the point $P_i$ has been completely processed in the contour line pattern image, and the microprocessor 71 then updates i to (i+1) in step S10 and subsequently proceeds to the next step S11.

Referring back to step S3, when in step S7 the point $P_i$ is not black and at a high level "1" but is white at a low level "0," if the number of points around the point $P_i$ which are black is found to be more than 1 in step S4, or if all the eight points $P_j$ have been completely checked in steps S5 and S6, the microprocessor 71 determines that there are no missing portions around the point $P_i$ and proceeds to steps S10 and S11.

The microprocessor 71 operates to scan all the points $P_i$ in the image memory 73 and to thus check whether all the points $P_i$ have been completely checked in the image elements of the contour line pattern image in step S11. If the microprocessor 71 has not yet completed all the checks of the image elements, it returns to step S2 and repeats the same steps for the next image element point $P_{i+1}$. When the microprocessor 71 has completed checks of all the image elements, it proceeds to step S12 and feeds the contends of the memory 73 through the printer controlling device 75 to the printer 76 and outputs the regenerated contour line pattern image.

It may be appreciated from the foregoing description that with the apparatus of the invention for regenerating the missing portions of the contour line pattern image thus constructed and operated, missing portions of the contour line pattern image occurring upon copying of the image are readily detected. The missing portions can then be regenerated and a proper contour line pattern image formed without any distortion.

It is noted that, although the described embodiment of the apparatus for executing the method of regenerating missing portions of the contour line pattern image is directed to an example in which the width and interval between the contour lines in the pattern image is one bit or image element, the present invention can be also applied to a case in which the number of the image elements is altered in width and interval between the contour lines in the pattern images by changing the steps of checking the contour line pattern image in the flowchart shown in FIG. 7. For instance, in case the width of the contour lines is 1 bit and the interval between the contour lines is 2 bits, the microcomputer 71 can then check whether the 24 points around the point $P_j$ which are black is less than 2 in step S6.

What is claimed is:

1. An apparatus for producing a contour line pattern image from an original image comprising:
   first and second frame memories A and B for respectively storing all contour line pattern image information of an original image;
   first means for detecting information of image elements around an image element to be processed read from said memory A and contained in one frame of said frame memories;
   second means for determining whether said image element to be processed is a part of a contour line of an image in accordance with information detected by said first means;
   third means for writing contour lines formed of an assembly of said image elements determined as contour lines at least at every other image element in said memory B;
   fourth means for outputting information stored in said memory B after completing processing of information of one original image and displaying said image; and
   a controller for controlling processing of said first to fourth means.

2. The apparatus for producing a contour line pattern image from an original image as defined in claim 1, wherein said memory A is responsive to original image data and also to an INITIAL signal at a high level from said controller to store original image data, and said memory B is responsive to an inverted INITIAL signal from said controller of a low level and also to said INITIAL signal from said controller at a high level for clearing all locations in said memory B, both said memories A and B being responsive to an addressing clock signal from said controller through address counting means, and said memory A being responsive to an addressing clock from said controller through address converting means when the addressing clock applied to said memory A proceeds that applied to said memory B by one scanning line segment.

3. The apparatus as defined in claim 2, wherein said address counting means is responsive to a RESET signal from said controller and also to clock signals from said controller for counting said clock signals, thereby designating a reading address of said memories A and B.

4. The apparatus as defined in claim 3, wherein said first means comprises:
   a 1-bit first shift register responsive to data read from said memory A for producing upper left position data;
   a 1-bit second shift register responsive to data from said first shift register for producing immediately upper position data;
   a 1-bit third shift register responsive to data from said second shift register for producing upper right position data;
   a 2046-bit fourth shift register responsive to data from said third shift register for producing left side position data;
   a 1-bit fifth shift register responsive to data from said fourth shift register for producing a point to be processed;
   a 1-bit sixth shift register responsive to data from said fifth shift register for producing left side position data;
   a 2056-bit seventh shift register responsive to data from said sixth shift register for producing lower left position data;
   a 1-bit eighth shift register responsive to data from said seventh shift register for producing immediately lower position data;
   a 1-bit ninth shift register responsive to data from said eighth shift register for producing lower right position data;
   a NAND gate responsive to outputs from said first, second third, sixth, eighth and ninth shift registers as upper left, immediately upper, upper right, left side, right side, lower left, immediately lower and lower right positions on an image for producing a low level output signal when all inputs to said NAND gate are high levels and in a write mode when said output of said NAND gate is at a high level, said output signal from said NAND gate being coupled to said memories A and B for setting said memories A and B in a read mode when said output signal from said NAND gate is at a low level; and an AND gate responsive to the data from said fifth shift register for coupling said output from said NAND gate to said memories in response to an addressing clock signal.

5. The apparatus as defined in claim 4, wherein said first means further comprises:

a flip-flop responsive to an output from said memory A to be placed in a set state;

address counting means for supplying address signals to said memories A and B and supplying said addressing clock signal;

2-bit counting means for producing a 2-bit binary count in response to said addressing clock signal from address counting means, count outputs of said 2-bit counter being "00" in a fourth frame of operation thereof, said flip-flop being responsive to a low level from said memory A to be placed in a reset state, thereby stopping operation of said controller.

6. An apparatus for detecting and erasing smudges on a contour line pattern image, comprising:

a plurality of 2039-bit shift registers;

a plurality of 9-bit shift registers connected in series with and between said 2039-bit shift registers;

an AND gate responsive to bit signals from selected ones of said 9-bit shift registers as upper left, immediately upper, upper right, left side, right side, lower left, immediately lower and lower right positions on an image for producing a smudge erasing signal when all the inputs to said AND gate are at a high level.

7. An apparatus as defined in claim 6, further comprising:

a first OR gate responsive to predetermined stages of a second and first of said 9-bit shift registers as third and fourth positions from a point to be detected, in an upward direction of said image;

a first NAND gate responsive to predetermined stages of a fourth and third of said 9-bit shift registers as first and second positions from said point to be detected, in an upward direction of said image;

a second AND gate responsive to the outputs from said first OR gate and said first NAND gate;

a second OR gate responsive to predetermined stages of an eighth and ninth of said 9-bit shift registers as third and fourth positions from said point to be detected, in a rightward direction of said image;

a second NAND gate responsive to predetermined stages of a sixth and seventh of said 9-bit shift registers as first and second positions from said point to be detected, in a downward direction of said image;

a third AND gate responsive to the outputs from said second OR gate and said second NAND gate;

a third OR gate responsive to predetermined stages of a fifth of said 9-bit shift registers as third and fourth positions from said point to be detected, in a leftward direction of said image;

a third NAND gate responsive to further predetermined stages of said fourth and fifth 9-bit shift registers as first and second positions from said point to be detected, in a leftward direction of said image;

a fourth AND gate responsive to outputs from said third OR gate and said third NAND gate;

a fourth OR gate responsive to still further predetermined stages of said fifth 9-bit shift register as third and fourth positions from said point to be detected, in a rightward direction of said image;

a fourth NAND gate responsive to additional predetermined stages of said fifth 9-bit shift register as first and second positions from said point to be detected, in a rightward direction of said image;

a first NOR gate responsive to outputs from said second through fifth AND gates for producing an output coupled to a stage of said fifth 9-bit shift register corresponding to said point to be detected.

8. The apparatus as defined in claim 7, further comprising:

a second NOR gate responsive to bit signals from selected predetermined stages of said fourth, fifth, and sixth, 9-bit shift registers, as upper middle left side, immediately upper, upper middle right side, upper right side, right side, lower right side, lower middle right side, immediately lower, lower middle left side, lower left side, left side and upper left side positions of said image for producing a smudge indicating signal when all inputs to a fourth stage, a stage of said point to be detected and a fifth stage of said fifth 9-bit shift register are at a high level.

9. A method of regenerating missing portions of a contour line pattern image, comprising the steps of:

reading and storing information representing said contour line pattern image in a binary format in a memory;

determining whether the number of image elements at a high level contained in image elements of a first predetermined area around an image element to be processed is less than a first predetermined number;

determining whether the image element to be processed is at an end of said contour line pattern image;

determining whether the number of image elements at a high level at an end of said contour line pattern image in the second determining step and contained in image elements of a second predetermined area around said image element at a low level among image elements of said first predetermined area around said image element is less than a second predetermined number;

determining whether a image element at a low level is a missing portion as a result of said third determining step; and converting information stored in said memory corresponding to image elements determined as missing portions of said contour line pattern image into a signal at a high level.

10. A method of regenerating missing portions of contour line pattern image, comprising the steps of:

reading and storing image elements in binary format of said contour line pattern image in a memory upon receipt of a START signal;

reading an image element dot to be processed from among stored image element dots of said contour line pattern image in said memory;

determining whether said image element to be processed read in said second reading step is white and at low level or black and at a high level "1";

counting the number of black image elements around said image element dot to be processed of said contour line pattern image and determining whether the number of black image elements is 1 or 0;

determining whether black image elements are at an end of said contour line pattern image and determining whether the number of black image elements around said image element dot to be processed is 1 or 0;

determining whether the number of image elements around each white image element being white and at a low level is less than 1 to thereby determine an image element dot as being not a missing portion when the number of the image elements is less than 1;

determining whether said first and third determining steps have been executed for all image elements;

executing said first and third determining steps for image elements around said image element dot to be processed repeatedly if said first and third determining steps have not been executed for all image elements;

detecting missing portions of said contour line pattern image at image elements around said image element dot to be processed when the number of the image elements around the image element dot to be processed which are black is 1 or 0 in said third determining step and converting data at locations corresponding to missing image element portions in said memory to a high level; and feeding checked contents of said memory through printer controlling means to a printer for outputting a regenerated contour line pattern image.

11. An apparatus for regenerating missing portions of a contour ling pattern image comprising:

contour line pattern image reading means for reading image elements in binary format of said contour line pattern image;

a program buffer memory for temporarily storing image elements to be processed together with programs for excuting a regenerating procedure for missing portions of said contour line pattern image;

an image memory for storing image elements of said contour line pattern image;

a printer for printing a regenerated contour line pattern image;

printer controlling means for controlling said printer to print said regenerated contour line pattern image; and a microprocessor for controlling processing of said reading means, program buffer and image memory and said printer controlling means for said printer.

* * * * *